United States Patent [15] 3,662,364
Patel et al. [45] May 9, 1972

[54] SCAN CONTROL FOR SYNCHRONIZING A DATA SIGNAL WITH A CLOCK SIGNAL

[72] Inventors: Arvindkumar M. Patel, Wappinger Falls; Anton G. Wellbrock, Yorktown Heights, both of N.Y.

[73] Assignee: International Business Machines Corporation, Armonk, N.Y.

[22] Filed: Dec. 22, 1969

[21] Appl. No.: 887,244

[52] U.S. Cl. ....................................... 340/174.1 M, 350/151
[51] Int. Cl. ................................... G11c 13/04, G11b 11/10
[58] Field of Search ............................ 340/174.1 M, 173 LM

[56] References Cited

UNITED STATES PATENTS 3,516,080 6/1970 Smith ................................. 340/174.1
2,987,249 6/1961 Van Vechten ........................ 340/174.1
2,909,972 10/1959 De Lando ........................... 340/174.1

*Primary Examiner*—Terrell W. Fears
*Attorney*—Hanifin and Jancin and Homer L. Knearl

[57] ABSTRACT

A magneto-optic transducing system is utilized to convert a magnetic recording into electrical signals. For purposes of decoding the electrical signals into data, it is necessary that the electrical signal transduced from a magnetic recording be synchronized with a reference clock signal. Synchronization is obtained herein by fixing the frequency of the reference clock signal and varying the frequency of the data signal as transduced from the magnetic recording. The frequency and phase of the data signal are varied by varying the scanning sweep speed used in a magneto-optic transducer. Two alternative embodiments are shown. In the first embodiment, the scanning is accomplished by a vidicon which scans the magneto-optic image of a large block of data. In an alternative embodiment, a cathode ray tube is used as the light source for the magneto-optic transducer so that each bit may be separately scanned by deflecting the beam in the cathode ray tube. Synchronization is obtained by comparing the frequency and phase of the data signal from the transducing system with the frequency and phase of the reference clock and feeding back an error signal to the deflection coils of the cathode ray tube or the vidicon. The correction signal increases or decreases the sweep speed as is necessary to synchronize the data with the clock.

10 Claims, 5 Drawing Figures

INVENTORS
A. M. PATEL
A. G. WELLBROCK
BY
Homer L. Knearl
ATTORNEY

FIG. 3
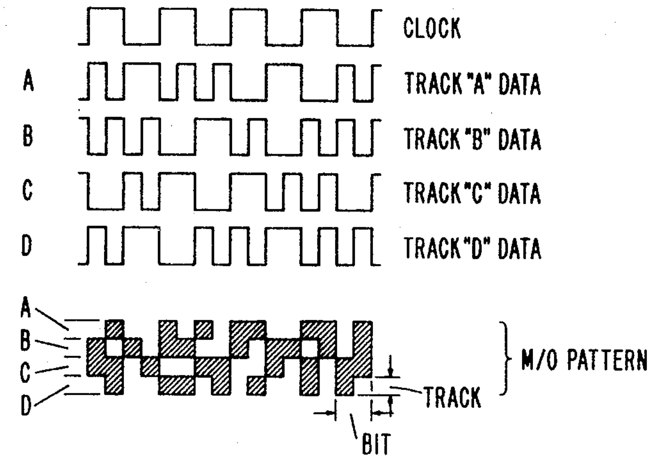
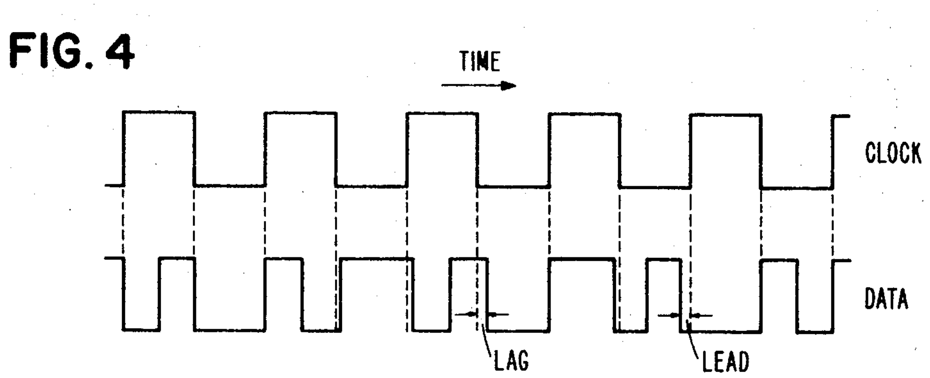
FIG. 5
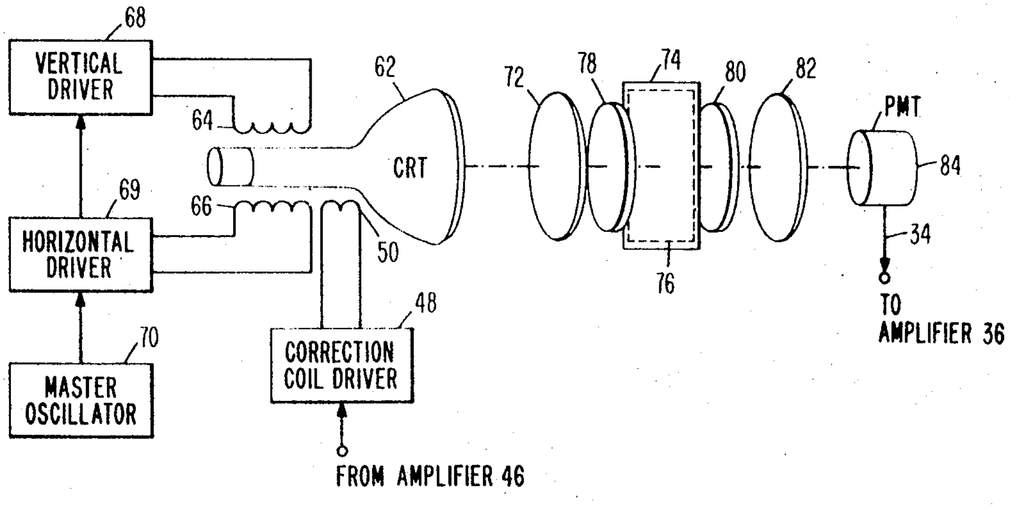

SCAN CONTROL FOR SYNCHRONIZING A DATA SIGNAL WITH A CLOCK SIGNAL

BACKGROUND OF THE INVENTION

This invention relates to synchronizing the signal read from a magnetic recording with a reference clock signal. More particularly, the invention relates to changing the rate at which a magnetic recording is scanned so that the frequency and phase of the signal read out of the magnetic recording can be synchronized with a fixed frequency signal of a reference clock.

In many recordings of data or information, it is customary to modulate the information or otherwise encode the information with respect to a clock signal. Subsequently, when the data is read out from the magnetic recording, it is necessary to have a reference clock signal for use in decoding the data in the magnetic recording. The speed at which the transducing apparatus operates is not sufficiently controllable to fix the frequency of the data signal read from a magnetic recording. In other words, the frequency of the data signal normally varies because of the limitations of the apparatus which transduces the signal from the magnetic recording. Therefore, there is a problem in decoding the data signal because it is necessary to provide a reference clock signal which is synchronized with the data signal.

In the past, the problem of synchronizing the data signal and the clock signal during decoding has been solved by either providing a variable frequency reference clock during decoding or by recording the reference clock signal along with the magnetic recording of the data signal.

By recording the clock signal along with the data signal, any variations in speed due to the transducing apparatus will occur in both the clock signal and the data signal. Therefore, the clock signal read from the magnetic recording and the data signal, also read from the magnetic recording, will be synchronized irrespective of variations in the transducing apparatus.

An alternative approach, wherein the clock signal is also recorded with the data signal, is to use the recorded clock signal to automatically control the transducing speed of the transducing apparatus. For example, the clock signal recorded on a magnetic tape can be compared with a fixed clock signal to generate an error signal to change the speed at which the tape moves. In this way, the speed of the tape can be more accurately controlled, and, thereby, the frequency variations due to speed of the tape can be minimized. This hardware, however, has limitations, in that, for present tape-drive hardware and present recording frequencies, the control of tape speed cannot be made sufficiently accurate to reduce the frequency variations in the data signal to an acceptable level.

The more typical solution to the problem is to not use a recorded clock signal at all. Instead, the reference clock is a variable frequency clock. The data signal read from the magnetic recording on the tape is then compared with the reference clock, and any error in frequency, or phase, is utilized to vary the frequency and phase of the reference clock. In this way, the variable frequency clock has an output signal which is made to follow variations in frequency and phase of the data signal.

It is an object of this invention to synchronize a data signal read from a magnetic recording with a fixed frequency reference clock.

It is a further object of this invention to change the rate at which a data signal is magneto-optically transduced, whereby the frequency of the data signal can be varied until it is in synchronism with the fixed frequency of a reference clock.

It is a further object of this invention to scan the magneto-optic image produced by a magneto-optic transducer with a variable sweep-speed scanner so that the frequency of the data signal read out may be adjusted by changing the sweep speed until the data is in synchronism with a fixed-frequency clock signal.

It is a further object of this invention to magneto-optically transduce a magnetic recording with a radiant energy beam whose sweep speed can be varied, whereby, the frequency of the data signal transduced from a magnetic recording can be varied until the data signal is in synchronism with a fixed frequency reference clock signal.

SUMMARY OF THE INVENTION

In accordance with this invention, the above objects are accomplished by scanning the magnetic recording so that the frequency and phase of an information signal read out from a magnetic recording is adjustable in accordance with the scanning sweep speed. The frequency and phase of the information signal is compared with the fixed frequency and phase of a reference clock signal, and the scanning sweep speed is adjusted until the information signal and the clock signal are synchronized.

As another feature of the invention, the scanning is accomplished by using a magneto-optic transducer and scanning the transducer to vary the rate at which data is read out from a magnetic recording. In one embodiment of the invention, this scanning is accomplished by scanning a magneto-optic image of many bits of data. The sweep speed while scanning the image controls the frequency of the data read out. In an alternative embodiment, the light source for the magneto-optic transducer is a flying spot scanner. As the flying spot sweeps across the transducer, one data bit at a time is converted into a magneto-optic image. The sweep speed for scanning each data bit controls the frequency of the data read out.

The great advantage of the invention is that a fixed frequency clock may be utilized, and the data signal can be synchronized to a clock signal by varying the speed of the scanner which reads out the magnetic recording. Particularly, in the environment of a magneto-optic transducer where optical scanning is necessary to transduce the magnetic recording, this invention simplifies the problem of synchronizing the data signal with a reference clock signal. The simplification comes, in that, a variable frequency clock is no longer required. Instead, the synchronization may be obtained by, simply, controlling the scanning rate used in the magneto-optic transducing system.

The foregoing and other objects, features and advantages of the invention will be apparent from the following, more particular description of the preferred embodiments of the invention, as illustrated in the accompanying drawings.

BRIEF DESCRIPTION OF DRAWINGS

FIG. 3 shows the clock signal and some typical phase encoded data signals for four different tracks. FIG. 3 also shows the magneto-optic pattern or image of the four data tracks.

FIG. 4 shows the reference clock signal and a typical data signal with examples of lead and lag conditions indicated.

FIG. 5 shows an alternative embodiment of the invention, wherein, a cathode ray tube is the light source used for the magneto-optic transducing function.

DESCRIPTION

Figure 1:
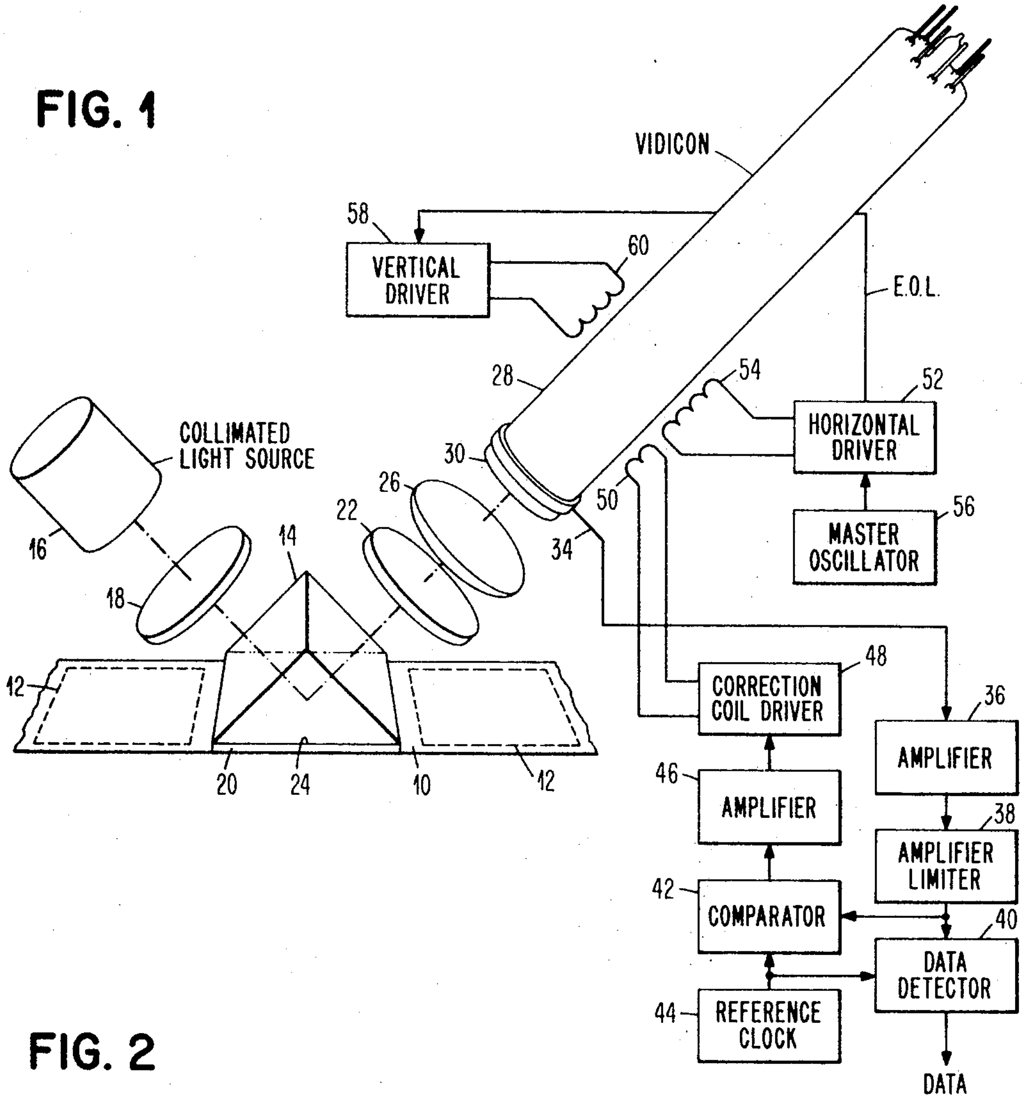
FIG. 1 shows a schematic representation of a preferred embodiment of the invention, wherein, a vidicon is used to scan the variations in radiant energy produced by a magneto-optic transducing system reading the magnetic recording.

Referring now to FIG. 1, one embodiment of the invention is shown. Magnetic tape 10, containing the magnetic recordings is incremeted so that it moves from left to right. Movement of tape 10 is in increments so that as each data cell 12 is to be read out, it is positioned under the prism 14.

The positions of several data cells 12 are shown by dash lines in FIG. 1. A data cell is simply an area of magnetic tape where a plurality of magnetic bits are recorded. The pattern of binary bits magnetically recorded in a data cell will be described later with respect to FIG. 3. For purposes of FIG. 1, the vertical direction and the horizontal direction for scanning are defined, as follows. The vertical dimension is in the direction of the motion of the tape, while the horizontal dimension is across the width of the tape. It is assumed herein that magnetic recordings are recorded in tracks across the tape, rather than along the length of the tape. Of course, the tracks could just as easily be recorded along the length of the tape. However, for the present invention, it will be assumed that a horizontal scan means a scan along one track and across the width of the tape.

The magneto-optic transducer consists of a collimated light source 16, a polarizer 18, prism 14 with a magnetic thin film 20 attached, and analyzer 22. With a data cell positioned adjacent the magnetic thin film 20, the magnetic recordings in the tape 10 transfer to the magnetic thin film 20. Collimated light source 16 is provided so that the rays of light striking the reflecting face 24 of prism 14 will all be parallel. With all the rays of light parallel, the angle of incidence of the light onto the reflecting surface can be optimized, and all rays will be striking at the optimum angle. It has been found that for maximum magneto-optic effect, an angle of incidence of about 41° is optimum.

Prism 14 is provided so that the face, at which the rays of light enter the prism, and the face, at which the rays of light leave the prism, are normal to the rays of light. Thus, reflection at the entering face and at exiting face of the prism is minimized.

Polarizer 18 is provided to linearly polarize the rays of light before they enter the prism. Linear polarization of the light rays is necessary for the type of magneto-optic transducing being performed in FIG. 1. Magneto-optic transducing, in effect, converts the magnetic recording variations into variations in the radiant energy beam. In FIG. 1, the variation in the radiant energy beam consists of rotation of the plane of polarization of the light ray. A magnetic recording oriented in a first direction will cause a ray of light reflected from the recording to have its plane of polarization rotated a first direction. A magnetic recording oriented in a second direction will cause the plane of polarization of the ray of light reflected from the recording to rotate in a second direction. The rotation of the light is in accordance with the magneto-optic Kerr Effect. In effect, the magnetic field produced by a magnetic bit stored in the thin film 20 reacts with the ray of light as it is reflected from face 24 of prism 14 to rotate the plane of polarization of the light ray.

The purpose of the analyzer 22 is to detect whether each ray of light has been rotated in a first direction or in a second direction. Analyzer 22 is simply another polarizing lens whose plane of polarization is oriented to pass rays of light rotated in a first direction and to block rays of light rotated in the second direction. Thus, the light emerging from analyzer 22 will be a white/black or a light/no-light radiant energy pattern or magneto-optic image which is identical to the pattern of magnetic bits recorded in the thin film 20.

Whereas, the variation in the radiant energy beam utilized in this magneto-optic transducer is rotation of the beam; an alternative technique would be to use variations in the intensity of light reflected from face 24. When detecting variations in the intensity of light rather than the rotation of the light, the polarizer and analyzer are not necessary. However, the detector which analyzes the reflected light must be insensitive to a DC level of light and highly sensitive to fluctuations in the light about the DC level.

In FIG. 1, the magneto-optic image or black/white image of the magnetic recording is focussed onto an image screen by lens 26. The object plane for lens 26 is the face 24 of the prism. The lens 26 should have sufficient depth of field to handle the entire face 24. The image plane for lens 26 is the screen of the vidicon tube 28.

Figure 2:
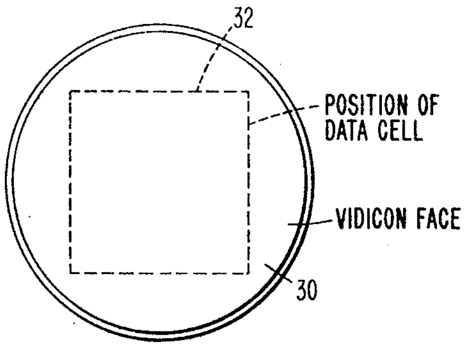
FIG. 2 shows the vidicon face which serves as the image screen for the magneto-optic image of data bits projected onto the screen.

The image screen of the vidicon or the vidicon face 30 is shown in FIG. 2. The position of the magneto-optic image of a data cell as projected onto the vidicon face 30 is shown by dashed lines 32.

As the cathode ray beam in the vidicon scans the vidicon face 30, the electrical signal over line 34 out of the vidicon is dependent upon whether the cathode ray beam strikes a black or white (no-light or light) image of each bit in the data cell on the vidicon face 30. The electrical signal on line 34, therefore, contains the serialized binary bits of the data signal in the magnetic recording as the vidicon cathode ray beam scans the magneto-optic image. The time of occurrence of data transitions in the data signal will depend upon the sweep speed of the cathode ray beam in the vidicon as it scans across the magneto-optic image of the data cell.

The data signal on line 34 is amplified by amplifier 36 which serves as a preamplifying stage. The data signal is then amplified again by amplifier-limiter 38. The signal is also limited or clipped by amplifier-limiter 38. The function of the amplifier-limiter 38 is to convert the data signal into a square wave highlighting the transitions from one voltage level to the other in the binary waveform. It is the time of occurrence of the transitions that carries the data information to be detected by the data detector 40. The amplified and clipped data signal in addition to being passed to the data detector 40 is also passed to a comparator 42.

The function of comparator 42 is to compare the occurrence of transitions in the data signal with the occurrence of transitions in a reference clock signal received from clock 44. Reference clock 44 is operating at a fixed frequency which is normally the same as the data signal. However, because of variations in reading out the data, the data signal may not be exactly in synchronism with the reference clock. When the transitions of data signal and the transitions of clock are not in synchronism, comparator 42 will generate an error signal. This error signal is amplified by amplifier 46 and passed to the correction coil driver 48.

The correction coil driver 48 responds to the magnitude and the sign of the error signal to generate an additional deflection voltage. This additional deflection voltage is applied to a cathode ray beam by the correction coil 50.

Normal deflection for line or track scan by the cathode ray beam is handled by the horizontal driver 52 exciting the horizontal deflection yoke 54. The signal applied to yoke 54 is a ramp signal which will deflect the cathode ray beam horizontally across the vidicon face 30. The ramp signal is generated from a master oscillator 56. At the end of each horizontal ramp signal, an end-of-line (EOL) signal is generated by the horizontal driver 52, which is passed to the vertical driver 58. The vertical driver 58 provides a signal to the vertical yoke 60 to deflect the beam vertically one increment. In effect, at the end of each horizontal scan, the cathode ray beam in the vidicon is moved vertically the height of one line or track. In this way, the horizontal driver 52 and the vertical driver 58 will cause the cathode ray beam to scan the data cell 32 projected onto the vidicon face 30.

The function of correction coil 50 is to add a correction deflection to the horizontal deflection. The amount of additional deflection provided by the correction coil in the horizontal direction is dependent upon the error signal out of the comparator 42. In this way, the error signal out of comparator 42 can cause the horizontal sweep of the cathode ray beam in the vidicon to increase in speed or decrease in speed.

There are a number of design parameters which can be built into the hardware represented in FIG. 1 to shorten its time of response for correcting synchronization between the data signal and the clock signal. A normal configuration for the comparator 42 would consist of a device to compare the time of occurrence of a data transition from the amplifier-limiter with time of occurrence of a transition in a clock pulse. The error signal from the comparator would then indicate the amount by which a data signal was leading or lagging a clock signal.

Examples of lead and lag between the data signal and the clock signal are shown in FIG. 4. For purposes of definition in FIG. 4, a lag condition exists when the transition during the data signal occurs after the transition in the clock signal. In other words, the data transition lags behind the clock transition. Conversely, a lead condition exists when the data transition occurs prior to the clock transition.

The comparator in FIG. 1 would convert a lag signal into an error signal having an amplitude proportional to the amount of lag and a sign indicating that the clock was lagging behind the data. Conversely, the comparator would indicate a lead error signal by generating a signal having a magnitude dependent upon the amount of lead and a sign opposite to the sign used for the lag error signal.

The analog error signal is amplified by amplifier 46 and then applied to the correction coil 50 by the coil driver 48. The coil driver 48 or the amplifier 46 would normally contain an integrated circuit. The function of the integrated circuit would be to act as a low-pass filter to effectively average the immediate history of error signals. This integrated circuit would dampen oscillations in the servoing process to synchronize the data signal and the clock signal. In effect, a short history of error in a particular direction would be required before a correction signal would be applied to change the horizontal sweep speed of the cathode ray beam.

In FIG. 3, an example of the clock signal and four track signals with the magneto-optic pattern is shown. The magnetic recording for each track is a binary recording which is phase encoded relative to the clock signal. The definition of phase encoding is that the data signal is sampled at each clock transition time, and if at that sample time, the data signal is making a transition from negative to positive, a binary one is defined. Conversely, if at the sampling time, the data signal is making a transition from positive to negative, a binary zero is defined. In other words, the phase of the data signal at the time of the sampling is indicative of whether the binary data is a one or a zero.

Four tracks, A, B, C, and D, are shown in FIG. 3. Each of the tracks is phase encoded. Note that a pattern of one-zero-one-zero-one-zero binary bits would produce a phase encoded data pattern similar in appearance to that of the clock signal. For track A, the binary data encoded reading from left to right at each clock transition is one-one-zero-zero-zero-one-zero-one-one. Note, that when there is a string of binary bits all identical, it is necessary to have a transition between clock transitions. This is required so that the next transition at the clock transition is oriented in the same direction as the data transition at the previous clock transition.

The magneto-optic image for tracks A, B, C, and D is shown at the lower portion of FIG. 3. This magneto-optic image is an example of the optical image which would appear on the vidicon face 30 in FIG. 1 or FIG. 2.

To acquire initial synchronization between the data signal and the reference clock, each line or track in a data cell, would have an alternate one-zero-one-zero-one-zero data-bit pattern for approximately the first eight bits. As pointed out above, this data-bit pattern produces a data signal substantially the same as the clock signal. As a worse case, the time of transition of such a data signal will be one-quarter of a clock cycle leading or lagging a clock transition. Comparator 42 in FIG. 1 would put out a correction or error signal so that before the eight bits are completely scanned, the data signal and the clock signal would be in synchronism.

An alternative embodiment of the invention is schematically shown in FIG. 5. Only a portion of the hardware for the alternative embodiment is shown in FIG. 5 since the remaining hardware is the same as that in FIG. 1. The alternative embodiment differs from the first embodiment, in that, the scanner in FIG. 5 serves as a light source for the magneto-optic transducer. In other words, instead of providing a scanner to scan the optic image produced by the magneto-optic transducer, the alternative embodiment provides a flying spot scanner as the light source for the magneto-optic transducing, bit by bit.

The scanner consists of cathode ray tube 62 driven by vertical deflection coil 64 and horizontal deflection coil 66. Cathode ray beam is deflected by these coils to scan the face of cathode ray tube 62. The scanning is controlled by vertical driver 68 and horizontal driver 69, just as in the embodiment shown in FIG. 1. In other words, master oscillator 70 provides a cyclic ramp signal which is used by the horizontal driver to deflect the cathode ray beam horizontally. At the end of each horizontal scan, horizontal driver 69 supplies the signal to the vertical driver 68 to increment the cathode ray beam vertically. In this way, the cathode ray beam will scan the face of cathode ray tube 62.

Lens 72 focusses the flying spot from the face of cathode ray tube 62 onto magnetic thin film 74. Magnetic thin film 74 has recorded thereon a data cell 76, similar to the data cells 12 in FIG. 1.

Polarizer 78 and analyzer 80 perform the same functions as polarizer 18 and analyzer 22 in FIG. 1. In other words, the beam of light is linearly polarized by polarizer 78 and the rotation of the beam of light is analyzed by analyzer 80. In this particular embodiment, the light beam passes through the magnetic thin film 74 instead of being reflected off of a surface attached to the thin film. In other words, the embodiment in FIG. 5 uses the magneto-optic Faraday Effect, rather than the magneto-optic Kerr Effect, as was used in FIG. 1.

The light passed by analyzer 80 is collected by lens 82 and focussed onto a photo-multiplier tube 84. The photo-multiplier tube produces an electrical signal on line 34. Variations in the electrical signal correspond to variations in light intensity received by the photo-multiplier tube and, thereby, indicate the variations in a magnetic recording stored in the thin film 74. The electrical signal over line 34 is passed to the amplifier 36, just as in FIG. 1. Thereafter, the data signal is operated on just as in FIG. 1 so that an error signal is produced if the data signal and the reference clock are not in synchronism. This error signal is passed back to the correction coil driver 48 to energize correction coil 50. The additional deflection of the cathode ray beam provided by coil 50 will either increase the horizontal sweep speed of the cathode ray beam.

In summary, the embodiment in FIG. 5 operates in the identical manner to that of FIG. 1, except that the scanning mechanism is used as the light source in the magneto-optic transducer. In FIG. 1, the scanning mechanism was scanning the magneto-optic image produced by a magneto-optic transducer.

While the invention has been particularly shown and described with reference to preferred embodiments thereof, it will be understood by those skilled in the art that various changes in form and details may be made therein without departing from the spirit and scope of the invention.

What is claimed is:

1. Apparatus for synchronizing an information signal read from a magnetic recording on a magnetic storage medium with a clock having a relatively fixed frequency comprising:

scanning means for scanning the magnetic recording to read out the information signal, the sweep speed of said scanning means being adjustable so that the frequency and phase of the information signal read out is adjustable;

means for comparing the frequency and phase of the information signal with the relatively fixed frequency and phase of the clock signal;

means responsive to said comparing means for adjusting the sweep speed of said scanning means until the frequency and phase of the information signal is the same as the frequency and phase of the clock signal.

2. Apparatus of claim 1 wherein said scanning means comprises:

a magneto-optic transducer for converting variations in the magnetic recording into variations in radiant energy;

means for sweeping said transducer with a beam to generate the information signal from the variations in the radiant energy, the sweep speed of said sweeping means being adjustable.

3. Apparatus of claim 2 wherein said sweeping means comprises:
an image screen;
means for projecting the variations in radiant energy onto the image screen;
an electron beam scanner for scanning the image screen;
means for converting the electron beam striking the image screen into the information signal indicative of the radiant energy variations;
means for changing the sweep speed of said electron beam scanner so that the frequency and phase of the information signal is adjustable.

4. Apparatus of claim 2 wherein said sweeping means comprises:
a cathode ray tube for generating a spot of light that sweeps across the face of the tube as the cathode ray beam is deflected;
means for focussing the spot of light from said cathode ray tube onto said magneto-optic transducer so that variations in the magnetic recording are converted into variations in radiant energy as the spot of light sweeps across said transducer;
means for converting the variations in radiant energy into the information signal;
means for changing the rate of deflection of said cathode ray beam so that the frequency and phase of the information signal is adjustable.

5. Method for synchronizing data read from a magnetic storage medium with a clock having a substantially fixed frequency comprising the steps of:
magneto-optically scanning the recording on the magnetic storage medium to read out the data;
comparing transitions in the data, magneto-optically read out, with clock transitions from the fixed frequency clock;
varying the sweep speed of said scanning step until the data transitions and the clock transitions are substantially concurrent.

6. Method of claim 5 wherein the step of magneto-optically scanning comprises the steps of:
magneto-optically transforming the recording into variations in a radiant energy beam to read out the data;
sweeping the radiant energy beam while magneto-optically transforming the recording whereby the time of occurrence of data transitions, magneto-optically read out, is dependent on the sweep speed.

7. Method of claim 6 wherein the step of sweeping comprises the steps of:

projecting the variations in the radiant energy beam onto an image screen;
scanning the image screen with an electron beam, the sweep speed of the electron beam during scanning being variable so that the time of occurrence of data transitions, magneto-optically read out, is variable.

8. In a magneto-optic transducing system for converting a magnetic recording into variations in radiant energy and, thereafter, into variations in electrical signals, apparatus for synchronizing the electrical signal carrying the recorded information with a clock signal having a fixed predetermined frequency, comprising:
means for changing the rate at which the magnetic recording is transduced magneto-optically into an electrical signal;
means for comparing the electrical signal with the clock signal and generating an error signal indicative of the lack of synchronization between the clock signal and the electrical signal carrying the recorded information;
said changing means responsive to the error signal to change the rate at which the magnetic recording is magneto-optically transduced, the magnitude and sign of the change being dependent on the error signal so that the rate of transducing the information will be changed until the electrical signal carrying the recorded information is synchronized with the clock signal.

9. In a magneto-optic transducing system, the apparatus of claim 8 wherein said changing means comprises:
a cathode ray tube having a screen;
means for projecting the variations in the radiant energy onto the screen;
deflection coils for the cathode ray for scanning the cathode ray across the screen;
a correction deflection coil for the cathode ray responsive to the error signal to deflect the ray in addition to the normal deflection due to the other deflection coils so that the sweep speed of the cathode ray during the scanning of the screen is dependent upon the error signal.

10. In a magneto-optic transducing system, the apparatus of claim 8 wherein said changing means comprises:
a flying spot scanner for generating the radiant energy beam used in the magneto-optic transducing system;
means for altering the sweep speed of said flying spot in response to the error signal so that the sweep speed of the radiant energy beam is dependent upon the error signal, and, therefore, the rate at which the magnetic recording is magneto-optically transduced is dependent upon the error signal.

* * * * *